United States Patent

Hesky et al.

[11] 4,206,185
[45] Jun. 3, 1980

[54] PROCESS TO RETAIN TRITIUM

[75] Inventors: Hans Hesky, Runkel; Armin Wunderer, Hofheim am Taunus, both of Fed. Rep. of Germany

[73] Assignee: Hoechst Aktiengesellschaft, Frankfurt am Main, Fed. Rep. of Germany

[21] Appl. No.: 886,520

[22] Filed: Mar. 14, 1978

[30] Foreign Application Priority Data

Mar. 16, 1977 [DE] Fed. Rep. of Germany ....... 2711373

[51] Int. Cl.² .............................................. G21F 9/04
[52] U.S. Cl. ............................ 423/219; 252/301.1 W; 423/394
[58] Field of Search ................ 252/301.1 W; 423/248, 423/249, 219, 235, 394

[56] References Cited

U.S. PATENT DOCUMENTS

| 1,623,606 | 4/1927 | Toniolo | 423/235 |
| 3,041,134 | 6/1962 | Weeks | 423/219 |
| 3,098,712 | 7/1963 | Andersen et al. | 423/219 |
| 3,937,649 | 2/1976 | Ridgely | 252/301.1 W |
| 3,954,654 | 5/1976 | Bernard | 252/301.1 W |

Primary Examiner—Benjamin R. Padgett
Assistant Examiner—Deborah L. Kyle
Attorney, Agent, or Firm—Curtis, Morris & Safford

[57] ABSTRACT

Tritium formed in the treatment of spent nuclear fuel and during storage of liquid, radioactive waste products is retained by adding oxygen to said liquid, radioactive waste products, reducing in a subsequent stage the oxygen enriched with tritium and separating it from the tritium. The reduction can be carried out with NO. The higher nitrogen oxides formed can be reacted to nitric acid.

4 Claims, 1 Drawing Figure

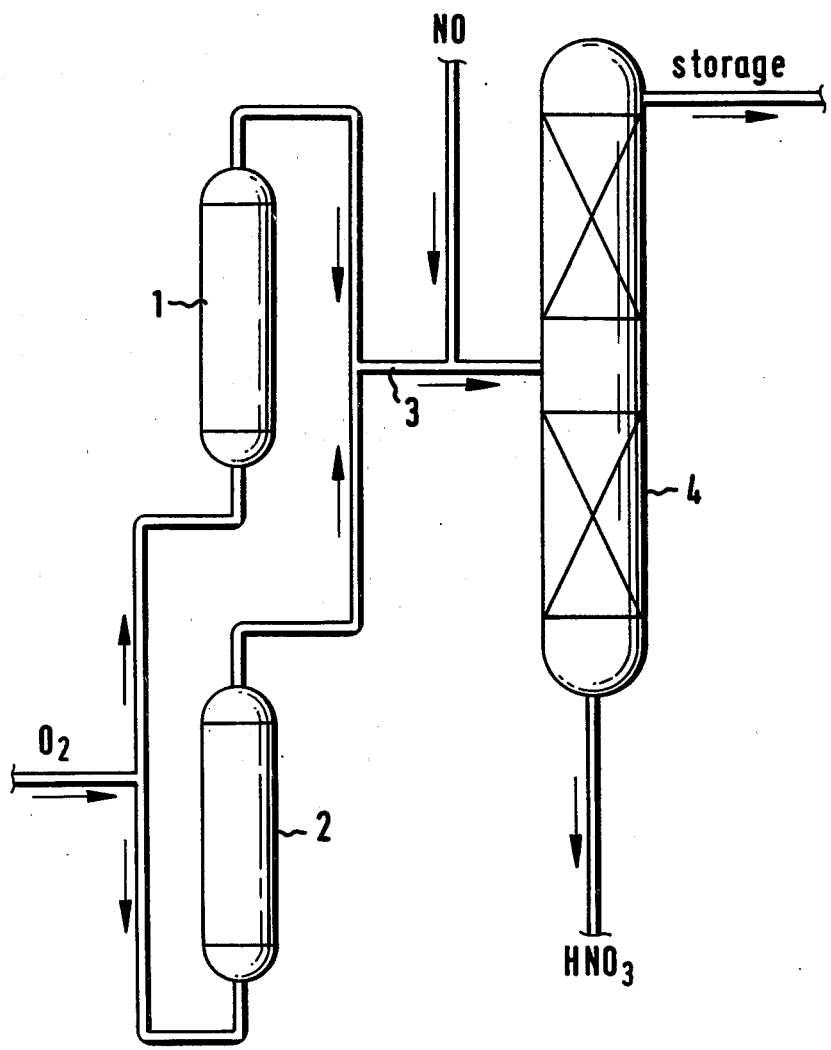

PROCESS TO RETAIN TRITIUM

This invention relates to a process for isolating tritium set free in the treatment of spent nuclear fuel and during the storage of liquid radioactive waste products formed in said treatment.

In the reprocessing of spent nuclear fuel the fuel is comminuted and dissolved in nitric acid. Uranium and plutonium are recovered from the liquid fraction. In the recovery of the nitric acid tritium water is obtained which must be kept under control while being stored because of its continuous decomposition into tritium-containing hydrogen and oxygen saturated with vapors of tritium water.

The highly active liquid waste products, i.e. the dissolved nuclear fuel and the fission products thereof, from which the uranium and plutonium have been separated, likewise contain and produce tritium. To avoid local concentrations and overheating the highly active liquid waste products are kept in motion by bubbling a gas therethrough. This gas simultaneously dilutes the content of tritium and hydrogen in the gas space so that the formation of explosive mixtures is avoided. For agitation by means of bubbles air is used. The disadvantage of this procedure is the fact that high amounts of nitrogen contaminated with radioactive substances is obtained which must be stored or purified in an expensive way to avoid environmental pollution. The expression "tritium" as used herein is intended to comprehend a mixture of hydrogen, tritium and tritium hydroxide.

It is an object of the invention to provide a process for retaining and separating tritium and other volatile radioactive fission products, if any, obtained in the processing of spent nuclear fuel, in which process no contaminated gases are formed that have to be purified and/or stored.

To solve the aforesaid problem a process is provided which comprises adding oxygen to the liquid radioactive waste products, reducing in a subsequent stage the oxygen enriched with tritium and separating the reduction product from the tritium.

To separate the tritium from the oxygen the latter can be reduced and the higher nitrogen oxides formed can be condensed or reacted to give nitric acid. Condensed tritium water possibly formed is recycled and used to dilute the liquid, radioactive waste products. The tritium water dissolved in the nitric acid formed can be passed into the working up process together with the nitric acid. The gaseous tritium and the liquid, radioactive fission products contained therein are stored.

Rubidium, a decay product of krypton, which is likewise formed in the nuclear fission of uranium and contained in the gases formed in the dissolution of spent nuclear fuel, forms hydrides with hydrogen and tridides with tritium. It is, therefore, advisable to store the tritium together with krypton. To this end the oxygen charged with tritium is contacted with a mixture of krypton and NO as obtained in the working up of the gases formed in the dissolution of the nuclear fuel. The tritium and krypton are then separated from oxygen or NO in the manner described above.

The process of the invention will now be described by way of example with reference to the accompanying flow sheet.

Referring to the drawing, the highly active, liquid waste products are contained in tank (1) and the tritium water obtained in the recovery of nitric acid is contained in tank (2). Oxygen is introduced into both tanks whereby the liquid, highly radioactive waste products are kept in motion for the reasons set forth above and in the gas space of the two tanks the content of tritium and hydrogen is diluted to avoid the formation of explosive mixtures. Through a collecting pipe (3), to which both tanks are connected, the oxygen charged with tritium is passed to an oxygen reduction column (4) in which the oxygen is preferably reduced by means of NO and the higher nitrogen oxides formed are reacted to yield nitric acid. The tritium obtained at the head of the column is stored and the nitric acid obtained as sump product is recycled into the reprocessing of the spent nuclear fuel (not shown).

What is claimed is:

1. Process for retaining tritium set free in the reprocessing of spent nuclear fuel and the storage of liquid radioactive waste products formed during said treatment, which comprises adding oxygen to the liquid, radioactive waste products, reducing in a subsequent stage the oxygen enriched with tritium by reacting the oxygen with NO and separating the higher nitrogen oxides formed from the tritium.

2. Process as claimed in claim 1, which comprises separating the higher nitrogen oxides formed by condensation.

3. Process as claimed in claim 1, which comprises separating the higher nitorgen oxides formed by reacting the higher nitrogen oxides to yield nitric acid.

4. A process according to claim 1 wherein the oxygen enriched with tritium is reduced by mixing it with a mixture of nitric oxide and krypton.

* * * * *